No. 640,241. Patented Jan. 2, 1900.
J. TRACY.
BICYCLE HANDLE BAR.
(Application filed Feb. 4, 1899.)
(No Model.) 2 Sheets—Sheet 1.
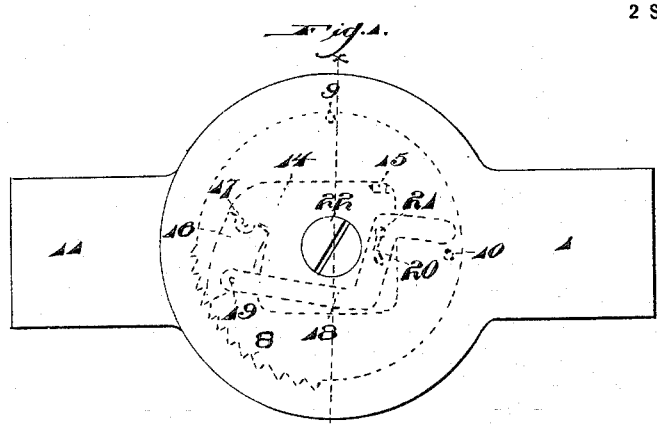
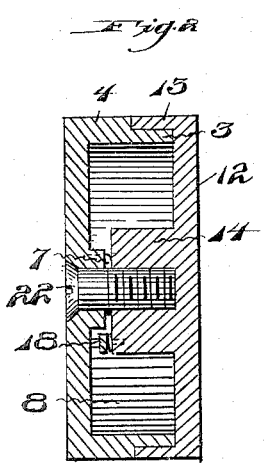
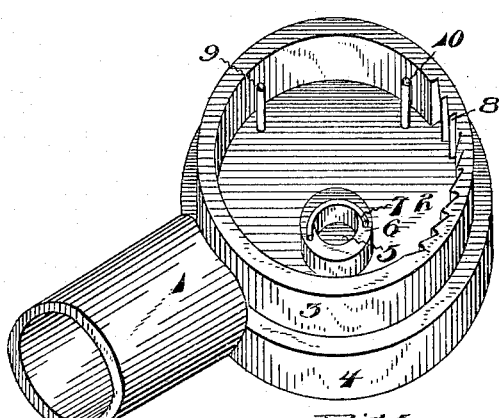
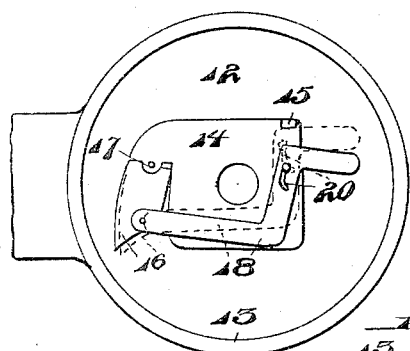
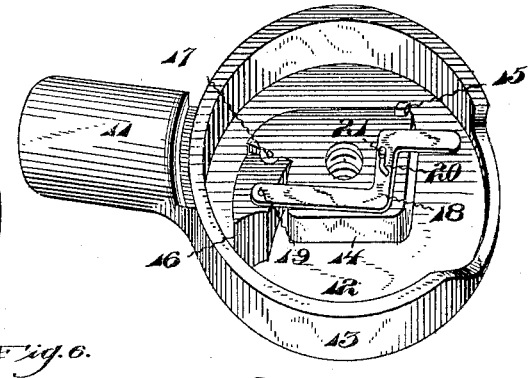
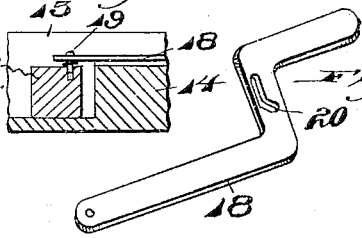
WITNESSES: INVENTOR
James Tracy.
BY
ATTORNEYS.

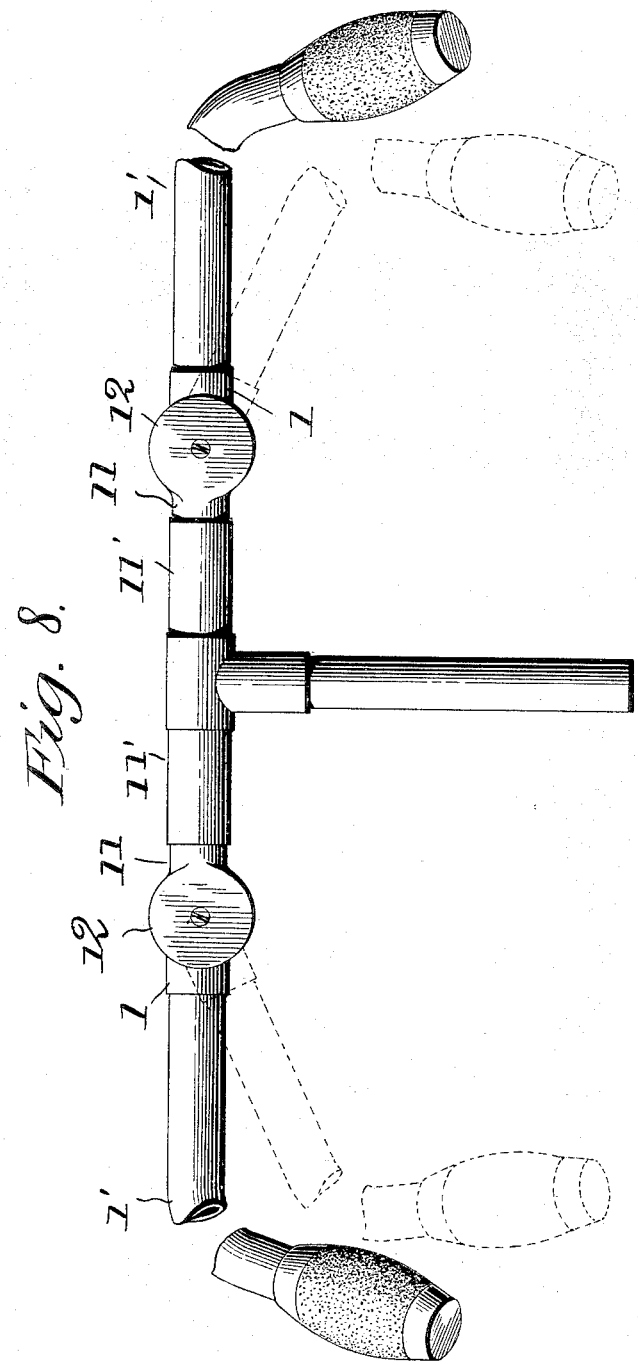

United States Patent Office.

JAMES TRACY, OF ALLEGHENY, PENNSYLVANIA.

BICYCLE HANDLE-BAR.

SPECIFICATION forming part of Letters Patent No. 640,241, dated January 2, 1900.

Application filed February 4, 1899. Serial No. 704,490. (No model.)

*To all whom it may concern:*

Be it known that I, JAMES TRACY, a citizen of the United States of America, residing at Allegheny, in the county of Allegheny and State of Pennsylvania, have invented certain new and useful Improvements in Bicycle Handle-Bars, of which the following is a specification, reference being had therein to the accompanying drawings.

My invention relates to certain new and useful improvements in adjusting devices for handle-bars.

My invention is particularly adapted for elevating and lowering a pair of handle-bars to the position desired.

My invention is adapted for use upon bicycles and so arranged that the weight on the handle-bars which are connected thereto will lock themselves in the desired position.

My invention finally consists in the novel combination and arrangement of parts hereinafter more fully described, and particularly pointed out in the claims.

In describing the invention in detail reference is had to the accompanying drawings, forming a part of this specification, wherein like numerals of reference indicate corresponding parts throughout the several views thereof, and in which—

Figure 1 is a rear view of my improved device. Fig. 2 is a vertical sectional view thereof, taken on the line $x\,x$ of Fig. 1. Fig. 3 is a front view of the outer or rigid cup or shell, showing the locking mechanism arranged therein. Fig. 4 is a perspective view of the inner or movable cup or shell. Fig. 5 is a perspective view of the outer or rigid cup or shell. Fig. 6 is a longitudinal sectional view of a portion of the outer or rigid cup or shell. Fig. 7 is a perspective view of the gravity-bar for releasing or locking the pawl or dog. Fig. 8 is a side view of my improved device as applied to a pair of handle-bars of a bicycle, showing in dotted lines the bars in a lowered position.

The steering-bar is divided into the stem proper, with a rigidly-attached short cross-bar and two adjustably-mounted grip-carrying bars joined to the cross-bar by my adjusting means.

I construct my improved adjusting device of an outer or rigid and an inner or movable cup or shell, the one of which is connected to one of the grip-carrying bars at one side, and the other cup or shell is connected to the end of the cross-bar of a bicycle, and within these cups or shells the various parts comprising my improved adjusting mechanism are arranged. The device illustrated in the accompanying drawings is used for adjusting the right handle-bar. The reverse arrangement of the various parts is employed when used in connection with the left handle-bar.

Referring to the drawings by reference-numerals, 1 indicates a hollow cylindrical extension, which is adapted to have the right handle-bar 1' secured thereto in any desirable manner at one end thereof and at the opposite end the inner or movable cup or shell, consisting of a plate or disk 2, having a collar 3 formed integral therewith, as shown. The periphery of the collar 3 is cut away, forming thereby an annular flange or ridge 4.

The plate or disk 2 is provided with an aperture 5, and surrounding the said aperture on the outer face of the plate or disk is an extending sleeve 6, which has secured to its outer face a spring-washer 7. This washer is arranged partly over the aperture in the sleeve 6 and consists of any suitable material—as shown, a piece of spring-wire.

The inner face of the collar 3 has arranged on a portion thereof a series of teeth or rack 8, the function of which will be hereinafter described. The top 2 has arranged therein or suitably connected thereto on its outer face the operating-pins 9 10.

11 indicates a hollow cylindrical extension of the same construction as the extension 1, and this extension 11 is secured at one end to the cross-bar 11' of a bicycle in any desirable manner and supports the adjusting means. The extension 11 has suitably connected to its opposite end the outer or rigid cup or shell, which is constructed of a plate or disk 12, having a collar 13 formed integral therewith, as shown, which is adapted to fit neatly upon the collar 3. The plate or disk 12 has formed on its inner face the supporting-block 14, having a screw-threaded aperture arranged therein and provided with an upwardly-extending lug 15 at one corner thereof, which acts as a stop. The supporting-block 14 is cut away at one side thereof to receive the gravity-pawl 16. The upper part of this cut-away portion acts as a bearing for the upper end of the gravity-pawl 16, which is pivotally secured to the supporting-block, as at 17. The gravity-pawl is tapered at its lower end to readily engage the teeth or rack 8.

18 indicates the gravity locking-bar, which is substantially Z-shaped and has its one end pivotally connected to the pawl or dog, as at 19, and the opposite end extending out from the supporting-block 14. This locking-bar is provided with an irregular slot 20, which has operating therethrough a headed pin 21. This pin is secured to the upper face of the supporting-block 14, as shown. The inner or movable cup or shell is pivotally secured to the outer or rigid cup or shell by means of the screw 22, operating through the aperture 5 and secured in the screw-threaded aperture formed in the supporting-block. The head of the screw is adapted to be countersunk in the outer face of the inner shell, as shown. The inner or movable cup or shell is adapted to fit within the outer or rigid cup or shell by means of a portion of its collar being cut away, as heretofore described. (For illustration, see sectional view of Fig. 2.)

It will be observed that the sleeve 6 acts as a bearing for the screw as well as the spring-washer 7, which, owing to its arrangement on the sleeve 6, presses firmly against one side of the screw and will prevent the rocking thereof.

The operation of my improved adjusting device is as follows: Assuming the parts to be assembled, the movable cup or shell is rotated to an extent sufficient to bring the pin 10 into engagement with the extending end of the locking-bar 18, elevating the said end of the bar, and thereby causing the same to withdraw the pawl or dog 16 from its engagement with the teeth or rack 8. The movable cup or shell is then adjusted to the desired position, and by jarring the device the gravity locking-bar will be caused to fall, thereby forcing the pawl or dog into engagement with the teeth or rack 8. If the adjustment made is sufficient, the pin 9 will be carried into engagement with the pawl or dog, thereby carrying the same into engagement with the teeth or rack to lock the parts. The gravity locking-bar is held suspended during the adjustment of the parts by reason of the pin 21 being drawn into the angularly-extending portion of the slot 20; but upon the jarring of the device or the engagement of the pin 9 with the pawl or dog 16 the bar is readily caused to assume its locking position.

Having thus fully described my invention, what I claim as new, and desire to secure by Letters Patent, is—

1. In an adjusting device for handle-bars, the combination of an outer and an inner shell, said outer shell being connected to the cross-bar of a bicycle and said inner shell being connected to a handle-bar, a supporting-block arranged in said outer shell, a pawl or dog pivotally secured in said supporting-block, a substantially Z-shaped gravity locking-bar arranged on said block and having its one end pivotally connected to said pawl or dog, a rack arranged within the inner shell, means carried by said inner shell for elevating the gravity locking-bar to withdraw the pawl or dog from engagement with said rack, and separate means adapted to engage said pawl to carry the same into locking engagement with the said rack, substantially as described.

2. In an adjusting device for handle-bars, the combination of an inner and an outer cup or shell pivotally secured together, said outer shell being connected to the cross-bar of a bicycle, and said inner shell being connected to a handle-bar, a rack arranged in said inner shell, a pivotally-supported pawl in said inner shell adapted to engage said rack, and a substantially Z-shaped gravity locking-bar arranged within said inner shell with its one end pivotally connected to said pawl to operate the same, substantially as described.

3. In an adjusting device for handle-bars, an outer shell, means for connecting said shell to the cross-bar of a bicycle, a supporting-block arranged within the said shell, an inner shell adapted to be connected to a handle-bar, a rack arranged within the inner shell, means for pivotally securing the said shells together, and means supported by the said supporting-block operating against the rack formed in the said outer shell for securing the inner shell in the desired position when adjusted, substantially as set forth.

4. In an adjusting device for handle-bars, an outer shell suitably connected to the cross-bar of a bicycle, a supporting-block arranged therein, a pawl pivotally connected to the said supporting-block, an angle-bar pivotally connected to the said pawl and slidably connected to said supporting-block, an inner shell adapted to be connected to a handle-bar, a rack arranged in the said inner shell, and means for bringing the said pawl in contact with the said rack securing the inner shell in the desired position when adjusted, substantially as set forth.

5. In an adjusting device for handle-bars, an outer shell suitably connected to the frame of a bicycle, a supporting-block arranged therein, a stop arranged on the said supporting-block, a pawl pivotally connected to the said block, an angle-bar for operating the said pawl pivotally connected thereto and slidably connected to the said supporting-block, an inner cup or shell suitably connected to a handle-bar, a rack arranged within the said inner shell, a pair of pins arranged within the said shell adapted to bring the said pawl into and out of engagement with the said rack, and means for pivotally securing the two shells together, substantially as set forth.

In testimony whereof I affix my signature in the presence of two witnesses.

JAMES TRACY.

Witnesses:
JOHN NOLAND,
JOHN GROETZINGER.